Jan. 16, 1968  T. J. ROBERTS ET AL  3,363,543
BARBECUE GRILL APPARATUS
Filed Jan. 7, 1966
2 Sheets-Sheet 1

INVENTORS
TOM J. ROBERTS
DONALD L. PAULSON
BY
T. Robert Henderson
ATTORNEY

Jan. 16, 1968     T. J. ROBERTS ET AL     3,363,543
BARBECUE GRILL APPARATUS
Filed Jan. 7, 1966
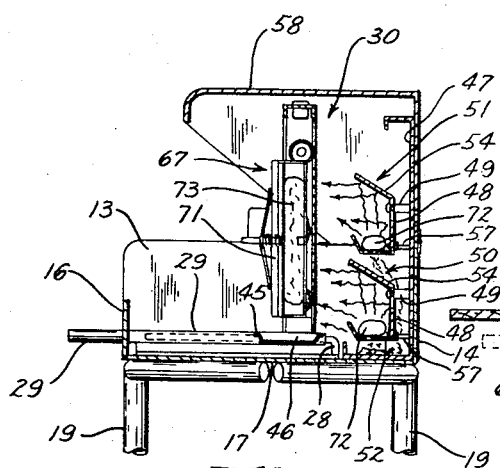
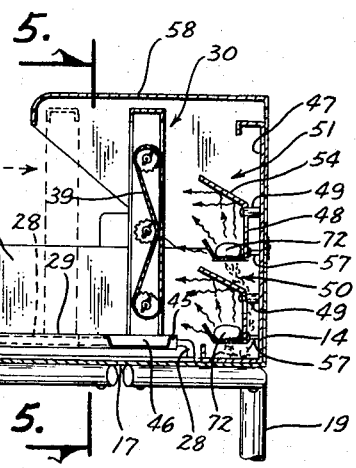
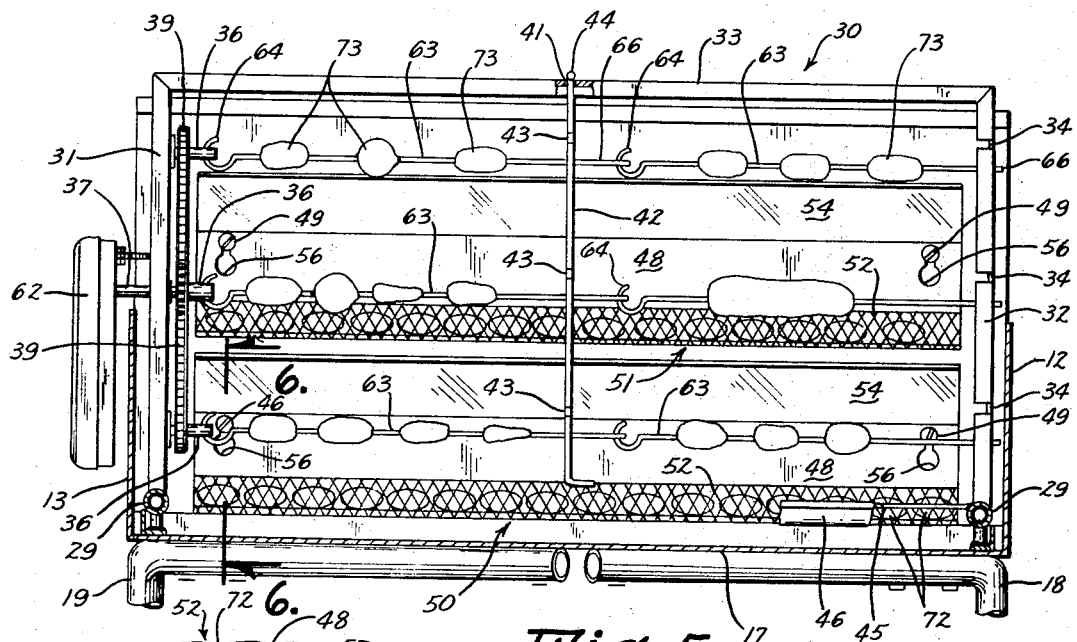
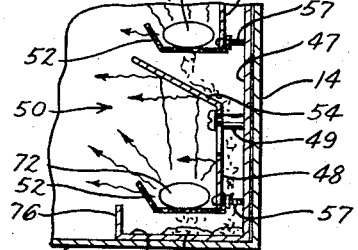
INVENTORS
TOM J. ROBERTS
DONALD L. PAULSON
BY
ATTORNEY

United States Patent Office 3,363,543
Patented Jan. 16, 1968

3,363,543
BARBECUE GRILL APPARATUS
Tom J. Roberts, 3914 73rd St., Des Moines, Iowa 50321, and Donald L. Paulson, Des Moines, Iowa; said Paulson assignor to said Roberts
Filed Jan. 7, 1966, Ser. No. 519,366
6 Claims. (Cl. 99—421)

ABSTRACT OF THE DISCLOSURE

This invention relates to an improved barbecue grill of a portable nature, and particularly wherein that which is to be barbecued is held in a vertical condition as compared to the conventional horizontal position, and wherein the cooking coals are held to one side of the meat holding structure in a vertical condition, thereby obviating hydrocarbon flames, and further wherein an ash deflector structure is provided such that ashes fall away from the coals.

---

It is an object of this invention to provide a barbecue grill wherein the flame-up caused by the juices and fat of cooking food falling on hot coals is prevented.

Another object of this invention is the provision of a barbecue grill wherein the cooking food is not charred by a flame-up.

Yet another object of this invention is the provision of a barbecue grill wherein the hydrocarbon deposit on cooked food normally associated with barbecuing is eliminated.

Still another object of this invention is to provide a barbecue grill wherein a heat deflector is utilized to direct the heat directly against the food being cooked.

A still further object of this invention is to provide a barbecue grill in which the coals are held in racks mounted in vertical relation to each other; and wherein, to prevent the ashes from an overhead rack from falling on the coals in a lower rack, thus substantially reducing the effective heat emitting therefrom, an ash deflector is provided.

A further object of this invention is to provide a barbecue grill wherein the ashes of the burned coals are readily removable.

Yet another object of this invention is to provide a barbecue grill wherein food being cooked thereon and the coals for cooking same are both held in substantially vertical, parallel planes, the horizontal distance therebetween being variable.

Another object of this invention is the provision of a barbecue grill as described, and further wherein a drip pan is associated with the meat holding unit so as to always ensure catching and retaining the drippings irrespective of the position of the meat relative to the coals.

A still further object of this invention is the provision of a barbecue grill wherein a plurality of skewers can be mounted thereon and be simultaneously rotated to facilitate the preparation of shish kebab.

Yet a further object of this invention is the provision of a barbecue grill which utilizes a minimum amount of fuel.

Another object of this invention is to provide a barbecue grill wherein a drip rack is always located immediately below the cooking food thus facilitating the cleaning of the grill.

Yet another object of this invention is the provision of a barbecue grill capable of attaining the above designated objects which is economical to manufacture, functional in use and appearance, and simple but rugged in construction.

These objects, and other features and advantages of this invention will become more readily apparent upon reference to the following description, when taken in conjunction with the accompanying drawings, wherein:

FIG. 3 is a reduced sectional view taken along the line 3—3 in FIG. 2;

FIG. 4 is a sectional view taken along the line 4—4 in FIG. 1;

FIG. 5 is an enlarged sectional view taken along the line 5—5 in FIG. 4, showing a plurality of meat holding skewers in place of the food rack of FIG. 2; and FIG. 6 is a fragmentary sectional view taken along the line 6—6 in FIG. 5.

Figure 2:
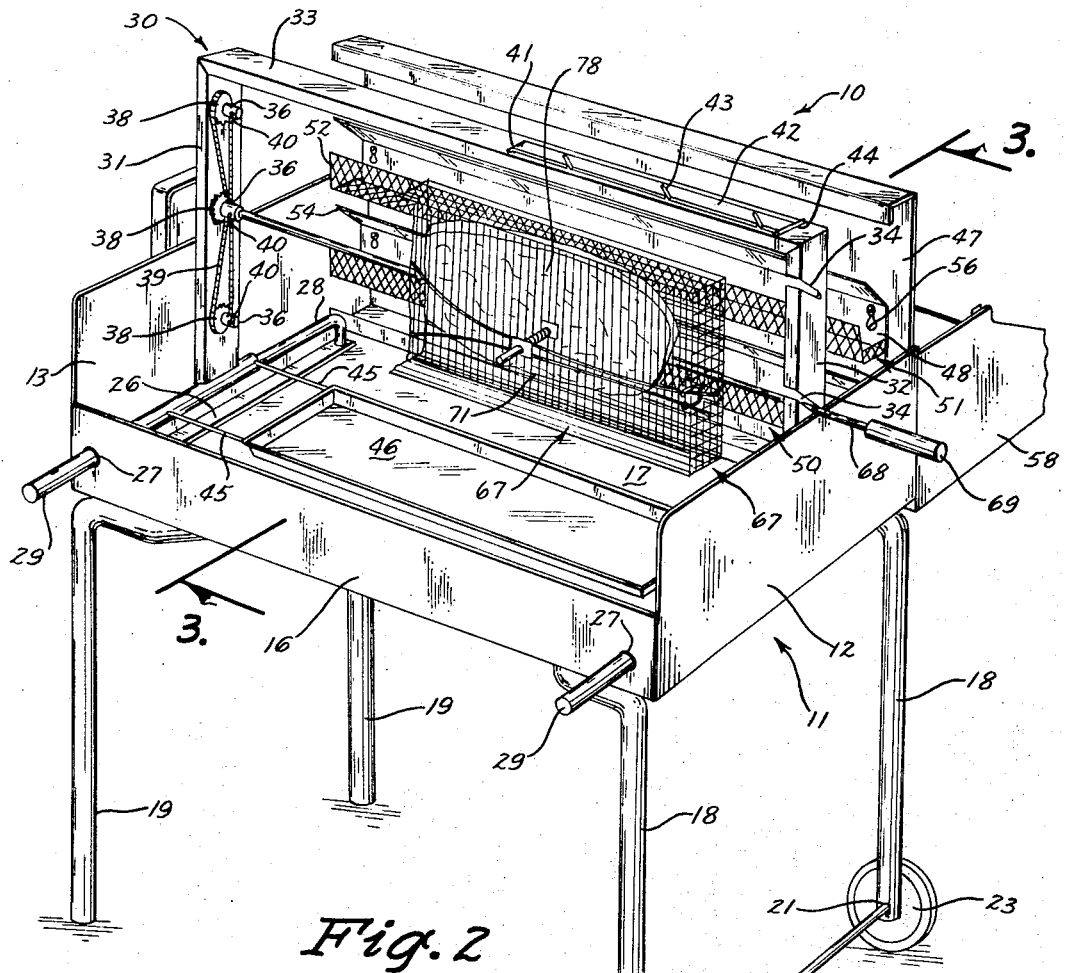
FIG. 2 is an enlarged perspective view of the barbecue grill with the hood in an open position, with the accessory shelf removed, and with the food rack in operating position.

The barbecue grill of this invention is indicated generally at 10 in FIG. 2, and includes a rectangularly shaped pan 11 (FIG. 2) having upstanding sides 12 and 13, a back 14 (FIG. 3), a front 16, and a bottom 17. The pan 11 is supported by a quartet of legs 18 and 19 (FIG. 2).

Figure 1:
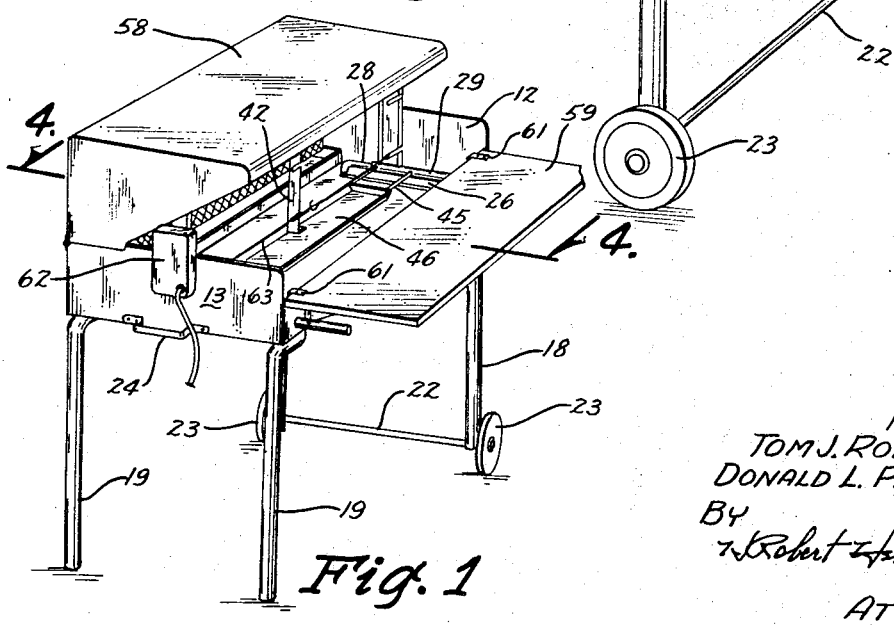
FIG. 1 is a perspective view of the barbecue grill of this invention with the hood thereof in a normal cooking position, with an accessory shelf attached to the front of the grill, and with the skewer support in operating position.

It will be noted in FIG. 3 that the legs are formed in a substantially L-shape wherein the upper short portion of each leg provides rigidity to the pan bottom 17. Each of the legs 18 supporting one end of the pan 11 have a hole 21 formed therein near the end opposite the pan 11. An axle 22 is rotatably mounted in the holes 21 and protrudes outwardly therefrom for receiving a wheel 23 at each end. It will be observed in FIG. 2 that the legs 18 are shorter than the legs 19, whereby upon mounting the wheels 23 the pan is maintained in a substantially horizontal position. A handle 24 (FIG. 1) is mounted on the side 13 for the purpose of facilitating the lifting of that end to allow easy maneuvering of the grill 10.

A pair of metal slats 26 (FIGS. 1 and 2) are mounted in parallel relation on the bottom 17 of the pan 11, at each side. In alignment with the slats 26 are a pair of openings 27 formed in the front 16 of the pan. An L-shaped rod 28 is secured at the end of the short leg thereof to each of the slats 26 while the long end is disposed above and parallel to the slat 26. Slidably mounted on each rod 28 in a telescopic manner is a tubular member 29 (FIG. 1) which extends outwardly through the openings 27 to form handles for manipulating the tubes 29.

An inverted U-shaped frame 30 (FIG. 2) is mounted on the members 29 and includes a pair of side supports 31 and 32 interconnected by a top brace 33. A plurality of inclined notches 34 are formed in the support 32 the purpose thereof will be described hereinafter. A plurality of vertically spaced shafts 36 are rotatably mounted on support 31. Each shaft 36 is in horizontal alignment with one of the notches 34. A socket (not shown) is axially formed in each of the shafts 36 on that end which is projected toward the notch 34. The center shaft 36 is integral with a second shaft 37 (FIG. 5) which extends outwardly from the pan 11. On each shaft 36 is mounted a gear 38, with the gears 38 being interconnected by an endless chain 39, whereby upon rotation of one gear the remaining gears will in turn rotate. A passage 40 is formed through each of the shafts 36 perpendicular to the axis thereof.

An elongated aperture 41 (FIG. 5) is formed in the top brace 33. Slidably mounted in the aperture 41 is an L-shaped bar 42, in which is formed a plurality of longitudinally spaced notches 43 that correspond to the notches 34. A boss 44 is formed on one end of the bar 42 to act as a stop so that the bar 42 will not slide through of the aperture 41. The purpose of the bar 42 will be described hereinafter.

A pair of parallel rods 45 (FIG. 2) are secured on each end thereof to the slidable members 29 and extend therebetween, thus forming an open rectangular shaped frame. A grease pan 46 is detachably mounted in the open frame. By securing the pan carrying rods 45 to the members 29, the grease pan 46 is always located directly underneath the frame 30, irrespective of the position of the frame 30.

For holding a combustible material, such as charcoal briquettes, a J-shaped member 47 (FIGS. 2 and 3) is provided, which rests upon the bottom 17 and against the pan back 14. Detachably secured to the member 47 are a plurality, such as two shown here, of racks 50 and 51 (FIGS. 5 and 6) suspended in vertically spaced relation. As each rack is identical, only one will be described with like reference numerals indicating like parts.

Rack 50 (FIGS. 2 and 3) includes a foraminous bottom 52 of wire or the like which functions as a basket, an upstanding rear wall 48, and a top wall 54 extending upwardly and outwardly from the rear wall 48 at an obtuse angle therefrom. Formed at longitudinally spaced intervals in the rear wall 48 are a plurality of key hole shaped openings 56. The basket 52 is secured to the lower edge of the rear wall 48 by a number of screws 57 which extend outwardly from the rear wall 48. Thus, by securing to the face of the member 47 a plurality of spacing devices 49 having the same longitudinally spaced interval as the openings 56, and capable of being inserted through the lower portions thereof, each rack can be hung onto each set of spacers 49, and whereby in cooperation with the screws 57, the rear wall 48 of each rack is spaced horizontally from the front face of the member 47.

Referring again to the frame 30 (FIG. 2), it is constructed to support either one or more skewers 63, or to support a food basket 67, both the skewers and the basket adapted to hold food such as meat and the like thereon.

Each skewer 63 comprises a rod having one end 64 formed in the shape of a hook, with the other end 66 being of a bayonet type, with an opening (not shown) formed therein.

To install a plurality, such as six skewers 63, onto the frame 30 the bar 42 is first slid into a position depending from the brace 33 (FIG. 5). The hooked end 64 of each skewer 63 is inserted through the passage 40 of each shaft 36, with the other end thereof resting in a notch 43. The next adjacent skewer 63 has its end 64 inserted through the opening of the bayonet end 66 of the first skewer, and with the bayonet end 66 of the second skewer resting in the notch 34 of the support 32.

The other four skewers are assembled in the same manner. Thus, by rotating the shaft 37 (FIG. 5) with an electric motor 62 provided therefor, rotation will be transmitted via the chain 39 and all three gears 38 to the three shafts 36 and the six skewers 63.

The food basket 67 (FIG. 2) includes a circular shaft 68, a handle 69 mounted on one end of the shaft 68 and a spring loaded basket 71. To install the food basket on the frame 30, one end of the shaft 68 is inserted in the opening 40 in the shaft 36 while the handle end of the shaft is slipped into the horizontally aligned support notch 34.

In operation of the barbecue grill 10, charcoal 72 or similar type solid fuel is placed on the racks 50 and 51, (FIG. 5) and ignited. At the appropriate time, food 73 is placed either in the food basket 67 or on the skewers 63, and the food holding devices are installed on the frame 30. Dependent on the amount of heat desired, the frame 30 is positioned relative to the coals 72 by pulling the members 29 outwardly for less heat, as shown by dotted line in FIG. 4, or by pushing them inwardly for greater heat.

Heat rising upwardly from the burning charcoal 72 is deflected by the top wall 54 of each rack, substantially horizontally toward the food thus increasing the efficiency of the barbecue grill. In the event the food basket 67 is utilized, upon broiling one side of the food 73, it can readily be turned by merely grasping the handle 69 (FIG. 2) and turning, thus positioning the uncooked side next to the coals 72. Where a rotisserie action is desired, the motor 62 is engaged thus causing either the skewers 63 or the food basket 67 to continously rotate.

The rack top walls 54 (FIG. 6) also act as ash deflectors, in that as the coals are consumed and ash created, it falls by gravity through the basket 52 upon the surface of the next lower top wall 54, where it is deflected toward the rear of that rack 50, whereupon it falls through the space between the racks and the member 47 onto the bottom 74 of the member 47. Referring to FIG. 6, it is noted that the bottom 74 is disposed beneath the racks 50 and 51, and extends outwardly in a straight manner from the member 47 to function also as a base for the combustible material holding structure for which to rest upon the pan bottom 17. Furthermore, an upturned lip 76 is formed on the forward edge of the bottom 74 to provide a retainer for the piles 77 of ashes. The member 47 with the racks 50 and 51 attached thereto, is easily lifted upwardly and out of the pan 11, thereby facilitating both the removal of ash, and the cleaning of the grill.

An accessory table 59 (FIG. 1) having a pair of angle braces 61 fastened to the top thereof is detachably mounted on the edge of the pan front 16 as best shown in FIG. 4. Triangular shaped braces 62 (FIG. 4) are secured to the underside of the table 59 to provide an additional bracing.

In summation, a barbecue grill has been described herein, which in addition to providing structure for locating the coals to the side of the food to be broiled, rather than below, also provides first a readily removable pan for catching and retaining the drippings; secondly, a heat deflection structure for deflecting the vertically rising heat substantially horizontally toward the food; and thirdly, a dual function of the heat deflection structure by using it also to deflect falling ashes away from the coals and into a channeled passage for efficient collection and easy removal of the ashes.

Although a preferred embodiment of this invention has been described and disclosed hereinbefore, it is to be remembered that various modifications and alternate constructions can be made thereto without departing from the true spirit and scope of the invention as defined in the appended claims.

We claim:

1. A barbecue apparatus comprising in combination: frame means;
    upstanding means mounted on same frame means for holding a combustible material, said upstanding means including a plurality of horizontally disposed, vertically spaced racks for holding a solid-fuel material, each rack having a foraminous bottom wall, a rear wall, and a solid top wall inclined upwardly and outwardly from said rear wall, whereby ashes falling through a bottom wall of one rack are deflected toward the outer surface of the rear wall of the next lower rack by the top wall thereof;
    means for holding an edible material movably mounted on said frame means for normally horizontal movement toward and away from said upstanding means; and
    means for catching and retaining drippings from said edible material holding means attached to and movable with said edible material holding means.

2. A barbecue grill as defined in claim 1, and further wherein said solid top wall extends angularly relative to said rear wall such that heat from said combustible material is deflected substantially horizontally toward said edible material holding means.

3. A barbecue grill as defined in claim 1, and further wherein said upstanding means includes a substantially vertically disposed plate to which said racks are detachably mounted, said rack rear walls spaced horizontally from said plate, said plate including an ash collector element extended horizontally outwardly from the base of said plate beneath said racks, said upstanding means replacably liftable upwardly and away from said frame means for the removal of the ashes.

4. A barbecue grill as defined in claim 1, and further wherein said edible material holding means includes an inverted U-shaped member having a pair of upstanding legs interconnected by a top element, one leg having a plurality of drivingly connected, vertically spaced rotatable socket wheels mounted thereon, with the other leg having a plurality of vertically spaced notches formed therein, each notch horizontally aligned with a socket wheel, and further wherein said edible material holding means includes one or more skewer devices, each skewer device having one end insertable into a socket wheel end and the other end resting in a leg notch horizontally aligned therewith for rotation in place.

5. A barbecue grill as defined in claim 4, and further wherein a brace having a plurality of spaced notches formed thereon is movable from a position disposed parallel with said top element to another position depended from said top element and disposed intermediate said legs, each skewer device comprising a pair of detachably connected skewer elements, each skewer element having a hook formed at one end insertable through a hole formed therefor in a socket wheel, and with a hole formed in the opposite end of said skewer element for receiving a hook from an adjacent element, each pair of interconnected skewer elements having one hook insertable into said socket wheel hole, with one element resting in one brace notch, and with the other element resting in one leg notch for rotation about a normally horizontal axis in place.

6. A barbecue grill as defined in claim 4, and further wherein said edible material holding means includes a pair of parallel, horizontally disposed rods secured to said frame means, and a pair of parallel tubes telescopically embracing said rods and reciprocally movable thereon, said tubes secured to said legs and to said means for catching and retaining drippings, whereby movement of said tubes effects simultaneous movement of said inverted U-shaped member and said means for catching and retaining drippings.

References Cited

UNITED STATES PATENTS

| 501,867 | 7/1893 | Cacciatori | 99—421 |
| 1,605,143 | 11/1926 | Renfroe | 99—421 |
| 2,573,988 | 11/1951 | Saltzberg | 99—421 X |
| 2,600,234 | 6/1952 | Foley | 99—421 |
| 3,045,581 | 7/1962 | Bernstein | 99—340 |
| 3,121,424 | 2/1964 | Russell | 99—339 X |

FOREIGN PATENTS

| 359,523 | 2/1962 | Switzerland. |

WALTER A. SCHEEL, *Primary Examiner.*

A. O. HENDERSON, *Assistant Examiner.*